(12) United States Patent
Chrysler et al.

(10) Patent No.: US 8,165,305 B2
(45) Date of Patent: Apr. 24, 2012

(54) ENHANCED RELATIONAL DATABASE SECURITY THROUGH ENCRYPTION OF TABLE INDICES

(75) Inventors: Steven O. Chrysler, Canandaigua, NY (US); Donald J. Dever, Webster, NY (US); Jesse Foote, Fairport, NY (US); Michael T. Kurdziel, Rochester, NY (US)

(73) Assignee: Harrison Corporation, Melbourne, FL (US)

( * ) Notice: Subject to any disclaimer, the term of this patent is extended or adjusted under 35 U.S.C. 154(b) by 805 days.

(21) Appl. No.: 12/329,791

(22) Filed: Dec. 8, 2008

(65) Prior Publication Data

US 2010/0142710 A1  Jun. 10, 2010

(51) Int. Cl.
*H04L 9/00* (2006.01)
*G06F 17/30* (2006.01)
*G06F 7/06* (2006.01)

(52) U.S. Cl. ............................ 380/277; 726/26; 707/705

(58) Field of Classification Search ....................... None
See application file for complete search history.

(56) References Cited

U.S. PATENT DOCUMENTS

| | | | | |
|---|---|---|---|---|
| 5,870,759 A * | 2/1999 | Bauer et al. | ............................ | 1/1 |
| 6,526,409 B1 * | 2/2003 | Olsen et al. | ...................... | 705/40 |
| 6,601,233 B1 * | 7/2003 | Underwood | ................... | 717/102 |
| 6,963,980 B1 * | 11/2005 | Mattsson | ....................... | 713/194 |
| 7,330,851 B2 * | 2/2008 | Percival et al. | ................ | 707/634 |
| 7,496,572 B2 * | 2/2009 | Blaicher | ................................ | 1/1 |
| 7,797,342 B2 * | 9/2010 | Banks et al. | ................... | 707/783 |
| 2007/0198551 A1 * | 8/2007 | Barnes et al. | .................. | 707/100 |

* cited by examiner

*Primary Examiner* — William Powers (74) *Attorney, Agent, or Firm* — Fox Rothschild, LLP; Robert J. Sacco (57) ABSTRACT

A system (108) for securing a database including a first and second tables is provided, where the first table includes a first key field and a first data field and the second table includes a second key field and a second data field. The first and second key fields specifying first and second key field entries having one common entry. The system (108) can replace the first key field entries with first adjusted key field entries based on first initialization vectors. The system (108) also replaces the second key field entries with second adjusted key field entries based on second initialization vectors different from the first initialization vectors. The system further encodes the first and the second adjusted key field entries based on index keys to generate an encrypted database. In the encrypted database, a value of the common entries in the first and second tables are different.

20 Claims, 7 Drawing Sheets

ENHANCED RELATIONAL DATABASE SECURITY THROUGH ENCRYPTION OF TABLE INDICES

FIELD OF THE INVENTION

The present invention is related to relational databases, and more particularly to enhancement of relational database security.

BACKGROUND

Relational databases generally utilize unique key fields or indices to associate data entries in different tables of the relational database. Typically, these key fields are based on unique identifier data or other sensitive data. For example, key fields for credit card records can include sensitive information such a credit card number or a Social Security number. Therefore, if a third party gains access to even a portion of the relational database, the entries in the key fields may allow a third party to gain access to not only other portions of the relational database, but also other databases and records. Accordingly, many relational databases storing sensitive data typically include security features. For example, a relational database can include stored procedures or passwords that control how the relational database may be accessed. However, such security features are not typically foolproof, as methods for third parties to bypass the stored procedures and passwords are available. Alternatively, a relational database can be encrypted using an encryption key. Encryption can obscure the entries in the relational database, but can increase the amount of computation required for accessing the database. Furthermore, certain types of encryption schemes are unsuitable for large amounts of data, as the encryption scheme may be discerned from the encrypted data.

Even if a portion of the contents of the relational database remains obscured by one or more of these approaches, the structure of the database is unaltered. That is, whether the information in the relational database is encrypted or decrypted or the relational database is secured otherwise, the relationship information between the entries in the various tables of the database can still be discerned, information which can be just as valuable as the sensitive data. As a result, a third party may be able use the relationship data to extract and improperly use information in the database. Therefore, there is a need for securing relationship information in a relational database.

SUMMARY

In the various embodiments of the present invention, systems and methods for enhancement of relational database security are provided. In a first embodiment of the present invention, a computer-implemented method of securing a database is provided. The database includes at least a first table and a second table, the first table includes at least a first key field and at least a first data field, the second table includes at least a second key field and at least a second data field, the first key field specifying a first plurality of key field entries, the second key field specifying a second plurality of key field entries, and each of the first and the second plurality of key field entries including at least one common entry. The method includes the steps of replacing the first plurality of key field entries in the database with a first plurality of adjusted key field entries, the first plurality of adjusted key field entries generated by applying one or more first initialization vectors to the first plurality of key field entries; replacing the second plurality of key field entries in the database with a second plurality of adjusted key field entries, the second plurality of adjusted key field entries is generated by applying one or more second initialization vectors different from the first initialization vectors to the second plurality of key field entries; and encoding the first and the second plurality of adjusted key field entries based on one or more index keys to generate an encrypted database. In the method, a value of the common entry in the first table in the encrypted database is different than a value of the common entry in the second table in the encrypted database.

In a second embodiment of the present invention, a system for securing data is provided. The system includes a storage element for storing a database, where the database includes at least a first table and a second table, said first table includes at least a first key field and at least a first data field, said second table includes at least a second key field and at least a second data field, said first key field specifying a first plurality of key field entries, said second key field specifying a second plurality of key field entries, and each of said first and said second plurality of key field entries including at least one common entry. The system further includes a processing element configured for securing said database. In the processing element, securing includes: replacing said first plurality of key field entries in said database with a first plurality of adjusted key field entries, said first plurality of adjusted key field entries generated by applying one or more first initialization vectors to said first plurality of key field entries; replacing said second plurality of key field entries in said database with a second plurality of adjusted key field entries, said second plurality of adjusted key field entries is generated by applying one or more second initialization vectors different from said first initialization vectors to said second plurality of key field entries; and encoding said first and said second plurality of adjusted key field entries based on one or more index keys to generate an encrypted database. In the system, a value of said common entry in said first table in said encrypted database is different than a value of said common entry in said second table in said encrypted database.

In a third embodiment of the present invention, a system for decrypting data is provided. The system includes a storage element for storing an encrypted database, where the encrypted database includes at least a first table and a second table, said first table includes at least a first encrypted key field and at least a first data field, said second table includes at least a second encrypted key field and at least a second data field, said first encrypted key field specifying a first plurality of encrypted and adjusted key field entries, said second encrypted key field specifying a second plurality of encrypted and adjusted key field entries, and each of said first and said second plurality of encrypted and adjusted key field entries specify at least one common entry, a value of said common entry in said first table different than a value of said common entry in said second table in said encrypted database. The system also includes a processing element communicatively coupled to said storage element, said processing element configured for accessing said database. In the processing element, accessing includes: decrypting said first and said second plurality of encrypted and adjusted key field entries based on one or more index keys to generate a first and a second plurality of adjusted key field entries; replacing said first plurality of adjusted key field entries in said database with a first plurality of decrypted key field entries, said first plurality of decrypted key field entries generated by applying one or more first initialization vectors to said first plurality of adjusted key field entries; and replacing said second plurality of adjusted key field entries in said database with a second plurality of decrypted key field entries, said second plurality of decrypted key field entries generated by applying one or more second initialization vectors different from said first initialization vectors to said second plurality of adjusted key field entries.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention provide systems and methods for securing relational database information by obscuring the relationship information therein. In particular, the various embodiments of the present invention provide for differentially obscuring the entries in the key fields or indices of different tables in a relational database containing common key field entries. The term "common entries", as used herein, refers to entries in different key fields that have the same values. Accordingly, after encryption, these common entries will be encrypted differently although the entries are the same values. As a result, access to the relationship structure of the database requires knowledge of how each and every one of the key fields of the relational database has been obscured. Therefore, even if a third party gains access to the relational database, without this knowledge the third party will not be able to easily discern the relationship between the data fields in different tables since the same entry will be obscured differently in each of the tables of the relational database.

Although the present invention will be described with respect to a few exemplary embodiments, the present invention may be embodied in many different forms and should not be construed as limited to the embodiments set forth herein.

For example, the present invention can be embodied as a method, a system, or a computer program product. Accordingly, the present invention can take the form as an entirely hardware embodiment, an entirely software embodiment or a hardware/software embodiment.

Figure 1:
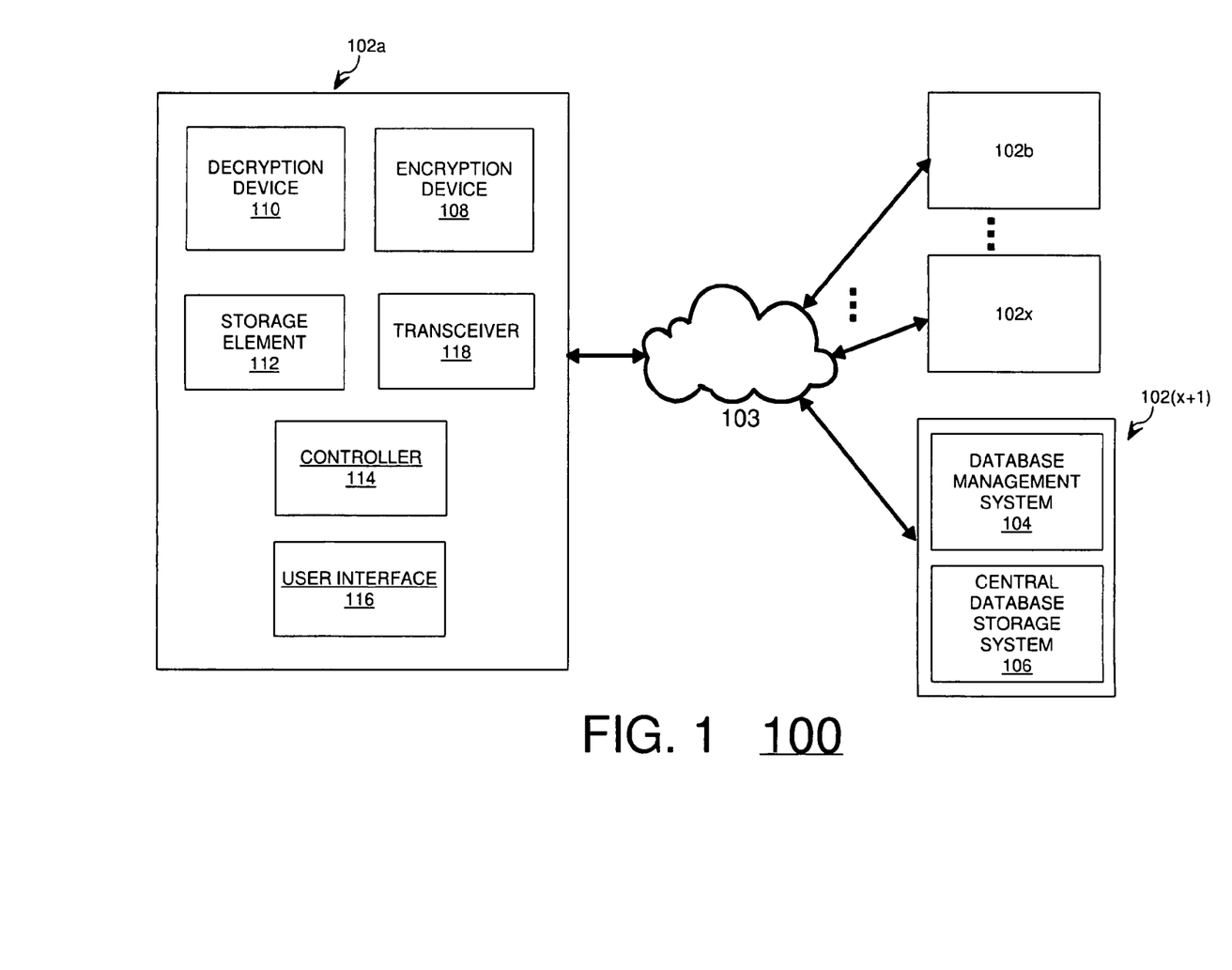
FIG. 1 is a block diagram of a relational database system according to an embodiment of the present invention.

FIG. 1 is a block diagram of a relational database system according to an embodiment of the present invention. The system 100 includes one or more database access systems (DACs) 102a, 102b, ..., 102x (collectively 102). In some embodiments of the present invention, the DACs 102 can communicate via a network 103 with a database management system (DMS) 104 that manages operations in central database system (CDS) 106, such as data retrieval, format conversion, and update and/or synchronization of database entries in the DACs 102 and the CDS 106. In the exemplary system 100, requests for database access can be submitted to the DMS 104 from the DACs 102. In embodiments of the present invention requiring security at all points in the system 100, the DMS 104 and the CDS 106 can also comprise a DAC 102(x+1), allowing the CDS 106 be monitored and managed locally via the DMS 104. However, the invention is not limited in this regard and the system 100 can also be configured to allow monitoring and management of the CDS 106 through other interfaces, including one or more of the DACs 102.

As shown in FIG. 1, a DAC 102a can include an encryption device 108, a decryption device 110, a memory or storage element 112, a controller 114, and a user interface (UI) 116. In embodiments where the DAC 102a operates in a system 100 communicating with the DMS 104 or other DACs 102b, ..., 102x, the DAC 102a can include a transceiver 118 for communicating over network 103. Operation of the encryption device 108 will be described in further detail below with respect to FIGS. 2 and 3. Operation of the decryption device 110 will be described below in greater detail with respect to FIGS. 4 and 5.

Although shown as a single computing system, the DMS 104 can be represented as centralized or decentralized computing devices. In the system 100, DACs 102, are shown connected by way of wire line or wireless access paths through a network 103 to the DMS 104. In embodiments where the DMS 104 comprises a distributed system, one or more of the DACs 102 can be connected to the same or different components of the DMS 104 over the network. DACs 102 can also operate as single computing systems or as centralized or decentralized computing devices. For example, in the exemplary system 100, DACs 102 can comprise one or more local or remote computing systems deployed over a network 103. Furthermore, although the DMS 104 and the DACs 102 are shown as separate systems, it is also within the scope of the present invention for the DMS 104 and the DACs 102 to operate as a single computing system.

Additionally, it is within the scope of the invention for a DACs 102 to represent any multimode communication device including, but not limited to, a cell phone, a personal computer or laptop, or personal digital assistant capable of supporting wire line and/or wireless communication technologies. In the case of wire line communications, DACs 102 can utilize xDSL, cable, or PSTN telephony interfaces for communicating over the network 103, which can include hybrid technologies that support circuit-switched packet-switched communications. The DACs 102 can also support accessory interfaces such as USB, Firewire, and other connectivity technologies.

Alternatively, or in combination, the DACs 102 can support any number of wireless communication protocols such as the family of 802.xx protocols defined by the Institute of Electrical and Electronics Engineers (IEEE). For instance, DACs 106 can utilize long-range wireless access technologies such as, for example, cellular, software defined radio (SDR) and/or WiMAX to communicate with the network 103. Cellular access technologies can include, for example, CDMA-1X, UMTS/HSDPA, GSM/GPRS, TDMA/EDGE, EV/DO, and next generation technologies as they emerge or develop. Additionally, DACs 102 can support short-range wireless technologies such as WiFi, Bluetooth, Zigbee, or cordless communications such as digital enhanced cordless telecommunications (DECT).

Although FIG. 1 shows an exemplary DAC 102a including an encryption device 108 and a decryption device 110, the present invention is not limited in this regard. In some embodiments, one or more of the DACs 102 can be configured for read-only access of a database. The "read-only" DACs 102 are configured to include a decryption device 110 and exclude the encryption device 108. In other embodiments, one or more of the DACs 102 can be configured to provide write-only access. The "write-only" DACs 102 are configured to include a encryption device 108 and to exclude the decryption device 110. Accordingly, each of the DACs 102 can support decryption and/or encryption operations to support reading and writing to a relational database in the various embodiments of the present invention.

In general, a decryption operation for one of the DACs 102 begins with retrieval of the relational database. For example, a decryption operation can be based on a read command, issued locally via the UI 116 or generated remotely by the DMS 104 and received by the controller 114. The read command can specify whether the relational database is to be accessed in part or in its entirety. Upon receipt of the read command, the controller 114 determines how to access and decrypt the requested data. For example, in the case of a standalone DAC, the controller 114 accesses the storage element 112 to access the locally stored relational database and decrypt any necessary portions. In another example, where the database is stored remotely, the controller 114, via the transceiver 118, communicates with the DMS 104 to retrieve copies of the requested portions of the database from the CDS 106 and afterwards perform the necessary decryption. In such embodiments, the one or more requested portions of the relational database in the CDS 106 are copied to the storage element 112. In yet another example, local and remote copies of the relational database can be stored. In such a configuration, the controller 114 can first communicate with the DMS 104 to determine whether a locally stored copy of the relational database in the storage element 112 needs to be updated prior to engaging in the decryption operation. One of ordinary skill in the art will recognize that various methods of synchronizing remote and local copies of a database are available.

Once the method of database access is determined by the controller 114, the controller 114 utilizes the decryption device 110 to decrypt the entries in the key fields in the various tables of relational database. That is, the controller 114 provides instructions to the decryption device 110 to access the relational database in the storage element 112 and to decrypt the data therein, including the key field. The controller 114 can also provide decryption key set information which specifies the set of decryption keys needed to decrypt entries in the key fields of the various tables of the relational database. Furthermore, in cases where the entries in the data fields of the tables are also encrypted, the decryption key set can also include any additional decryption keys needed for the data fields. As previously described, operation of the decryption device 110 will be discussed below in further detail. The decryption key set is generated or stored, locally or remotely, depending on the configuration of system 100.

Figure 4:
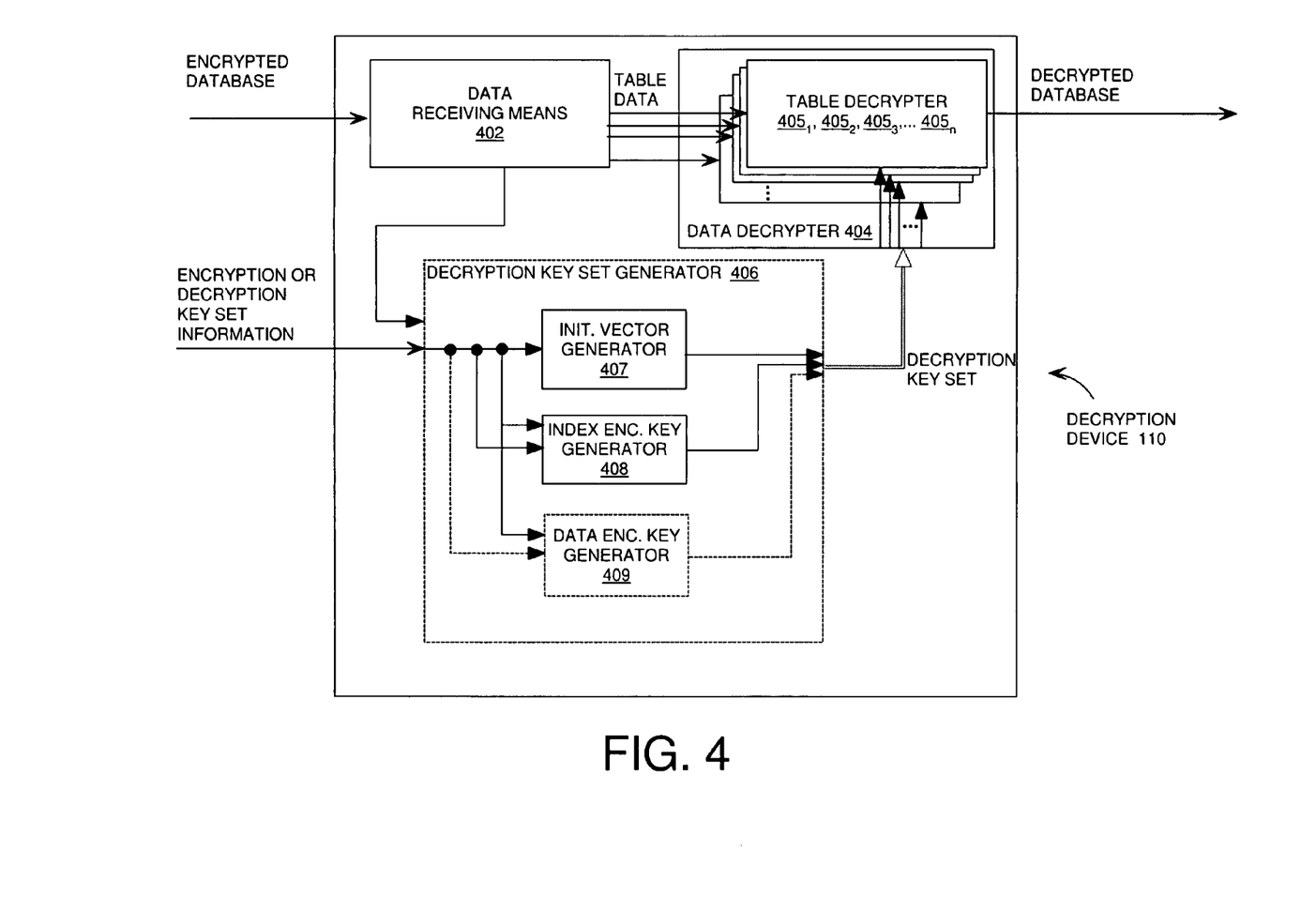
FIG. 4 is a block diagram of the decryption device in FIG. 1
Figure 5:
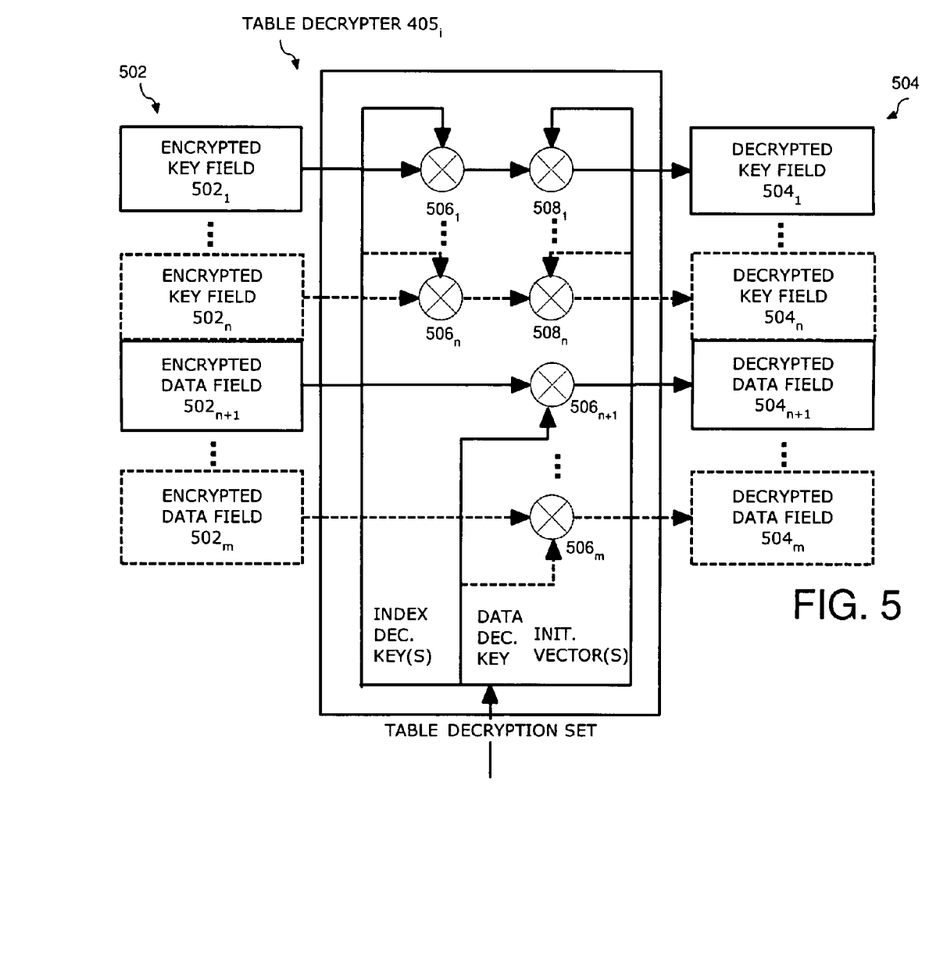
FIG. 5 is a flow diagram of the table decrypter in FIG. 4.

Generation and use of the decryption key set will be described below in further detail with respect to FIGS. 2, 4 and 5. Once decrypted, the contents of the relational database can then be presented to a user via the UI 116 or stored in the storage element 112 for use in database operations. In various embodiments, the decrypted contents can be persistent or temporary. That is, the decrypted contents can be used to permanently replace any locally stored encrypted versions of the data in the relational database. In other embodiments, the decrypted data can be stored only temporarily and can be discarded upon an expiry of time, a new command, or the termination of a session or connection to the DMS 104.

An encryption operation for one of the DACs 102 begins with the receipt of unsecured data for the relational database. For example, an encryption operation can be based on a write command, issued locally via the UI 116 or generated remotely by the DMS 104 and received by the controller 114. The write command can specify whether the data is to be encrypted in part or in its entirety. Upon receipt of the write command, the controller 114 utilizes the encryption device 108 to encrypt entries for the key fields in the tables of the relational database. The encryption device 108 can receive encryption key set information from the controller 114 that can specify how the key fields in each table are to be encrypted. In some embodiments, the encryption key set information comprises the encryption key set to be used. In other embodiments, encryption device 108 generates the decryption key set based on one or more parameters specified by the controller. Generation and use of the encryption key set will be described below in further detail with respect to FIGS. 2 and 3. Furthermore, in cases where the entries in the data fields are also to be encrypted, the encryption key set can also include any additional decryption keys needed for the data fields. As previously described, operation of the encryption device 108 will be discussed below in further detail. The encryption key set can be stored locally or remotely, depending on the configuration of system 100. Once the encryption is complete, a copy of the relational database is stored in storage element 112. In some embodiments, the relational database can be uploaded to the CDS 106 or DACs 102 in the system 102. As previously noted, many methods of synchronizing databases are available and will not be discussed here. Additionally, the unencrypted data can be persistent or temporary. That is, any unencrypted data used for generating the encrypted relational database can be stored locally for local use and encrypted versions can be used for updating remote copies of the data in the relational database. In other embodiments, the encrypted database immediately replaces the unencrypted database, requiring local decryption.

Figure 2:
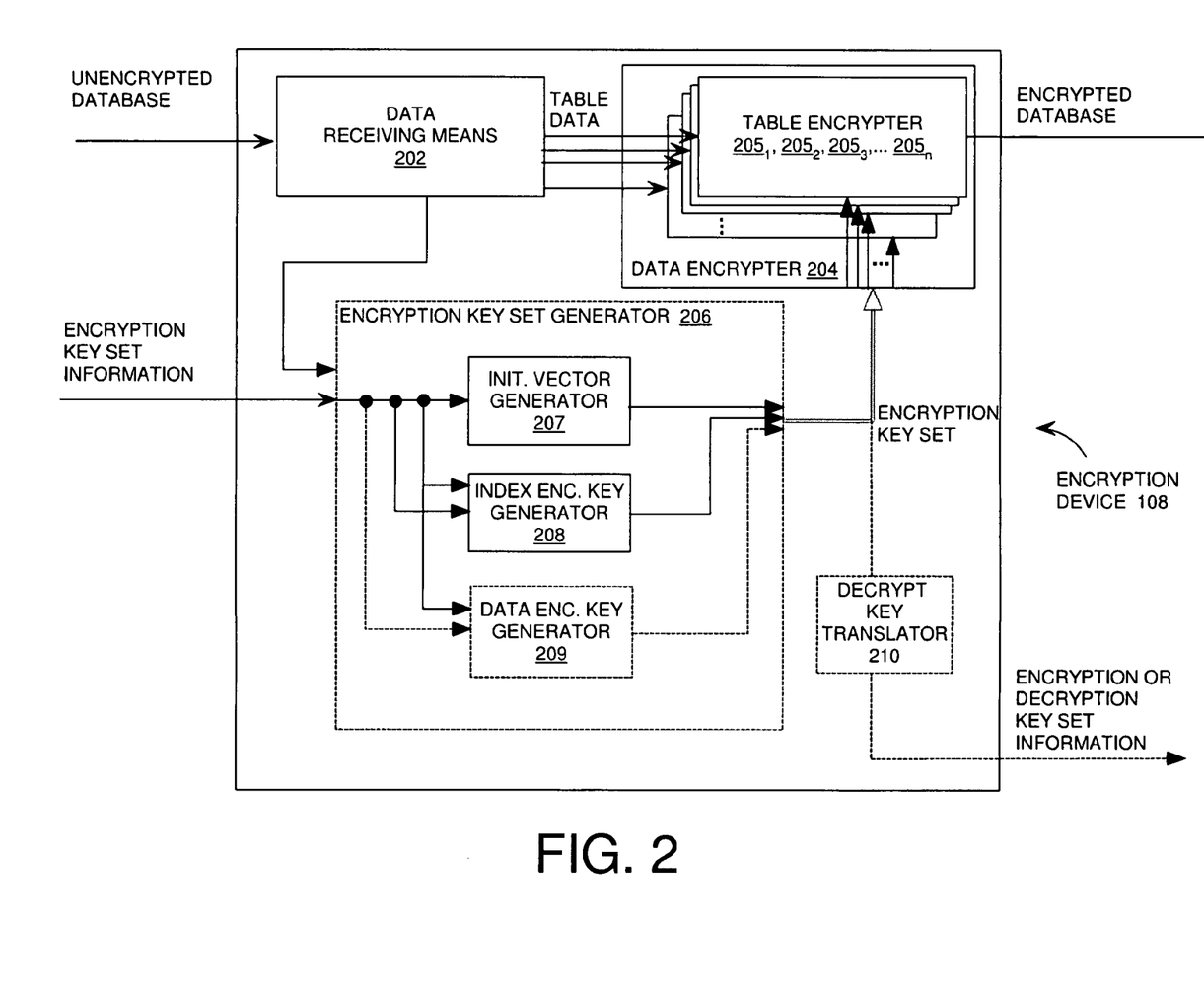
FIG. 2 is a block diagram of the encryption device in FIG. 1.

FIG. 2 is a block diagram of the encryption device 108 in FIG. 1. As shown in FIG. 2, the encryption device 108 includes a data receiving means 202 and a data encrypter 204. The data encrypter 204 includes a plurality of table encrypters $205_1, 205_2, 205_3, \ldots 205_n$ (collectively 205) for encrypting each of the tables of the database to produce the relational database. In operation, each of the table encrypters is configured to receive data for one of the tables from the data receiving means 202 and a portion of the encryption key set corresponding to the encryption keys to be associated with a particular table. Details of the operation of the table encrypters 205 will be described below with respect to FIG. 3.

In some embodiments of the present invention, the encryption device 108 is configured to receive and parse an encryption key set for use with the data encrypter 204. In other embodiments, the encryption device 108 instead receives encryption key set information from the controller 114, which specifies one or more parameters for generating the encryption key set. In such embodiments, the encryption device 108 includes an encryption key generator 206 for generating an encryption key set for the data encrypter 204. In yet other embodiments, the encryption device 108 is configured to receive and differentiate between receipt of the encryption key set and receipt of encryption key set information that provides parameters for generating the encryption key set. The generated encryption key set is such configuration is stored for future use.

As shown in FIG. 2, the encryption key set generator 206 generates an initialization vector (IV) for each table and an index encryption key using an IV generator 207 and a index encryption key generator 208, respectively. The number of tables (and therefore the number of keys needed) can be provided by the data receiving means 202. The use of the IVs and the index encryption keys in the encryption process will be described below with respect to FIG. 3. In embodiments of the present invention where the entries in the data fields are also encrypted, the encryption key set generator 206 further includes a data encryption key generator 209 for generating at least one data encryption key.

In the various embodiments of the present invention, the IVs for each table are unique. However, the index or data encryption keys can be the same or different. Accordingly, the decryption key set can include at least n+2 keys for a database including n tables. However, the present invention is not limited solely to single instances of generators 207, 208, and 209. For example, in the case of tables including two or more key fields, additional IV generators can be provided. Similarly, multiple instances of generators 208 and 209 can be provided to produce additional encryption keys. However, a single instance of any of generators 207, 208, and 209 can also be configured to generate any number of IVs, index encryption keys, or table encryption keys. Furthermore, any or all of generators 207, 208, and 209 can operate cooperatively. That is, at least one initial value can be provided for generating all keys. For example, the encryption key set information can specify a first IV for a first table or first key field. The IVs for other tables or key fields can then be generated based on this first IV. Alternatively, an iterative process can be used in which the second IV is based on the first IV, the third IV is based on the second IV, and so forth. Similarly, index encryption keys and data encryption keys can also be generated in the same manner.

In some embodiments of the present invention subsequent decryption of the encrypted database may be symmetric or asymmetric. That is, the decryption keys required for subsequent decryption of the relational database may be the same or different than the encryption keys. In the case of a symmetric decryption, the keys are identical. However, in the case of asymmetric decryption, the keys are different and need to be generated based on the encryption keys used and the encryption and decryption methods to be used. Accordingly, in embodiments of the present invention utilizing asymmetric decryption, the encryption device 108 can also be configured to generate a decryption key set or decryption key set information including one ore more parameters for generating the decryption key set. For example, as shown in FIG. 2, the encryption device 108 includes decryption key translator 210 for generating the asymmetric key. Various methods for generating such key are available will not be described here.

Figure 3:
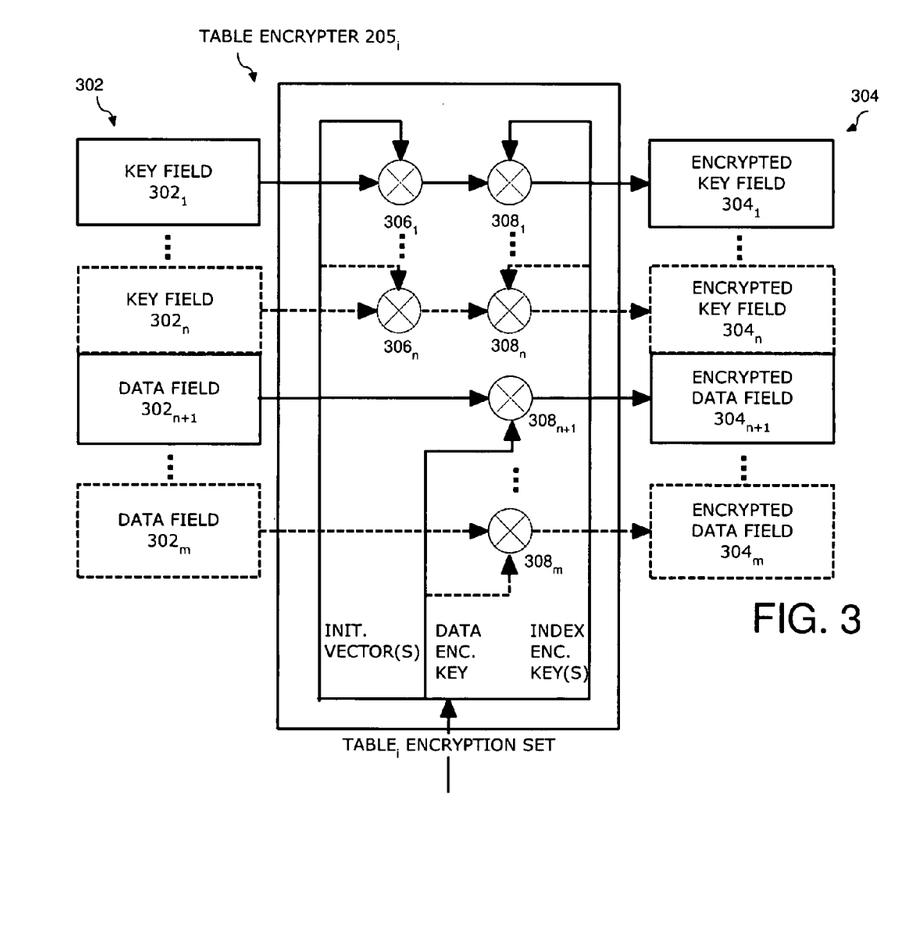
FIG. 3 is a flow diagram of the table encrypter in FIG. 2.

Operation of each of the table encrypters 205 will now be described with respect to FIG. 3. FIG. 3 shows a flow diagram of one of the table encrypters 205$i$ in FIG. 2. As shown in FIG. 3, the table encrypter 205$_i$ receives a database table 302 as an input and outputs an encrypted database table 304. The exemplary database table 302 in FIG. 3 includes one or more key fields $302_1 \ldots 302_n$ and one or more data fields $302_{n+1} \ldots 302_m$. Accordingly, the corresponding encrypted database table 304 also includes one or more key fields $304_1 \ldots 304_n$ and one or more data fields $304_{n+1} \ldots 304_m$. However, in the various embodiments of the present invention, the database tables can include any number of key fields and data fields. Furthermore, each of the database tables need not have the same number of key fields and data fields.

The table encrypter $205_i$ operates by first receiving a table encryption set. The table encryption set, as previously described, can be the portion of the encryption key set generated or received by the encryption device 108 and associated with database table 302. The table encryption set includes, as previously described, IVs, index encryption keys, and, if needed for enhanced security, data encryption keys. In operation, the table encrypter $205_i$ first modifies or adjusts the entries in at least one of the key fields $302_1 \ldots 302_n$ using the IV(s) from the table encryption set in operations $306_1 \ldots 306_n$. Although a single IV can be provided for each table, in some embodiments, different IVs can be provided for different ones of key fields $302_1 \ldots 302_n$ in database table 302. During operations $306_1 \ldots 306_n$, a mathematical operation is performed on each entry in one or more of the key fields $302_1 \ldots 302_n$ based on the IV(s) for the table 302. For example, an operation $306_1$ can comprise a summing operation in which the bits representing the IV for key field $302_1$ are added to each string of bits representing the individual entries in key field $302_1$. A similar adjustment operation can be performed for other key fields in database table 302, as shown in FIG. 3. The table encrypter $205_i$ then encrypts these adjusted entries in key field $302_1$ at operation $308_1$ based on an index encryption key included in the table encryption set received by table encrypter $205_i$. A similar encryption operation can be performed for other key fields in database table 302, as shown in FIG. 3. Although an encryption key can be provided for each table, in some embodiments, different encryption keys can be provided for different ones of key fields $302_1 \ldots 302_n$ in database table 302.

In the various embodiments of the present invention, any type of encryption scheme can be utilized during operations $308_1 \ldots 308_n$. However, some types of encryption can result in increased storage requirements or increased computation requirements during subsequent decryption. Therefore, in some embodiments of the present invention, to expedite the encryption process and/or minimize the amount of storage required for the relational database, encryption schemes providing a one-to-one correspondence between the unencrypted and encrypted data can be provided, such as electronic codebook (ECB) encryption. Although ECB encryption and similar types of encryption methods are generally considered limited security encryption schemes, the combination of the modification at operations $306_1 \ldots 306_n$ and an ECB encryption at operations $308_1 \ldots 308_n$ provides sufficiently different and sufficiently encrypted values for common entries in the key fields of different tables. Accordingly, the exemplary table encryption set in FIG. 3 can include one or more index encryption keys for an ECB-based encryption operations at operation $308_1 \ldots 308_n$.

As previously described, for additional security, the entries in the data fields $302_{n+1} \ldots 302_m$ can also be encrypted at operations $308_{n+1} \ldots 308_m$. In some embodiments, the same encryption method and key can be used for both the key fields $302_1 \ldots 302_n$ and the data fields $302_{n+1} \ldots 302_m$. Although the encrypted data fields $304_{n+1} \ldots 304_m$ could be used to at least partially discern the encryption key used at operations $308_1 \ldots 308_n$, the entries in the key fields $302_1 \ldots 302_n$ would still be at least partially protected via the initial modification at operations $306_1 \ldots 306_n$. However, in some cases even this partial protection may be insufficient to prevent a third party from discerning the entries in key fields $302_1 \ldots 302_n$. Therefore, in some embodiments of the present invention, the encryption keys, the encryption scheme, or both can be different for operations $308_1 \ldots 308_n$ versus operations $308_{n+1} \ldots 308_m$ to further increase security of the relational database.

Once the various tables of the relational database are encrypted, subsequent access to the relational database can require a decryption step, as described above. FIG. 4 is a block diagram of the decryption device 110 in FIG. 1. As shown in FIG. 4, the decryption device 110 can include a data receiving means 402 and a data decrypter 404. The data decrypter 404 includes a plurality of table decrypters $405_1$, $405_2$, $405_3$, ..., $405_n$ (collectively 405) for decrypting each of the tables of the database to retrieve the unencrypted information in the relational database. In operation, each of the table decrypters 405 is configured to receive data for one of the tables from the data receiving means 402 and a portion of the decryption key set corresponding to the decryption keys to be associated with a particular table. In some embodiments of the present invention, parsing of the decryption key set can be performed by the data encrypter 404. Details of the operation of the table decrypters 405 will be described below with respect to FIG. 5. In some embodiments of the present invention, the decryption device 110 is configured to receive a decryption key set for use with the data decrypter 404. In other embodiments, the decryption device 110 instead receives decryption key set information specifying one or more parameters for generating the decryption key set. In such embodiments, the decryption device 110 includes a decryption key generator 406 for generating a decryption key set for the data decrypter 404. Operation of the decryption key generator 406 is similar to operation of encryption key generator 206 described above with respect to FIG. 2 and the description above is sufficient for describing the operation of decryption key generator 406. In some embodiments, the decryption device 110 can receive encryption key set information. Accordingly, the decryption key set generator 406 can be further configured to perform any translation required for generating an asymmetrical decryption key set. Such methods are well-known to those of ordinary skill in the art and will not be described here.

Operation of each of the table decrypters $405_i$ will now be described with respect to FIG. 5. FIG. 5 shows a flow diagram for a table decrypter $405_i$ in FIG. 2. As shown in FIG. 5, the table encrypter $405_i$ receives an encrypted database table 502 as an input and outputs an unencrypted database table 504. The exemplary database table 502 in FIG. 5 includes one or more key fields $502_1 \ldots 502_n$ and one or more data fields $502_{n+1} \ldots 502_m$. Accordingly, the corresponding encrypted database table 504 also includes one or more key fields $504_1 \ldots 504_n$ and one or more data fields $504_{n+1} \ldots 504_m$. However, in the various embodiments of the present invention, the database tables can include any number of key fields and data fields. Furthermore, each of the database tables need not have the same number of key fields and data fields.

The table decrypter $405_i$ operates by first receiving a table encryption set. The table encryption set can be the portion of the decryption key set generated or received by the encryption device 108 and associated with database table 402. The table decryption set includes, as previously described, IVs, index decryption keys, and, if needed for enhanced security, data decryption keys. In operation, the table decrypter $405_i$ first decrypts the entries in key fields $502_1 \ldots 502_n$ at operations $506_1 \ldots 506_n$ based on the index decryption key included in the table decryption set received by table decrypter $405_i$. If necessary, the entries in the data fields $502_{n+1} \ldots 502_m$ are also decrypted at operations $506_{n+1} \ldots 506_m$. Afterwards, the table decrypter $405_i$ can modifies the decrypted entries from the encrypted key fields $502_1 \ldots 502_n$ using the IV(s) from the table encryption set to produce decrypted key fields $504_1 \ldots 504_n$ at operations $508_1 \ldots 508_n$. That is, as previously described with respect to FIG. 3, a mathematical operation is performed on each decrypted entry from encrypted key fields $502_1 \ldots 502_n$ using the IV(s) from the table encryption set to undo any modifications during encryption. For example, if encrypted database table 502 comprises encrypted database table 304 in FIG. 3, the same IV(s) added to the entries in key fields $302_1 \ldots 302_n$ from database table 302 can be subtracted from the decrypted entries from encrypted key fields $502_1 \ldots 502_n$ in encrypted table 502.

Figure 6:
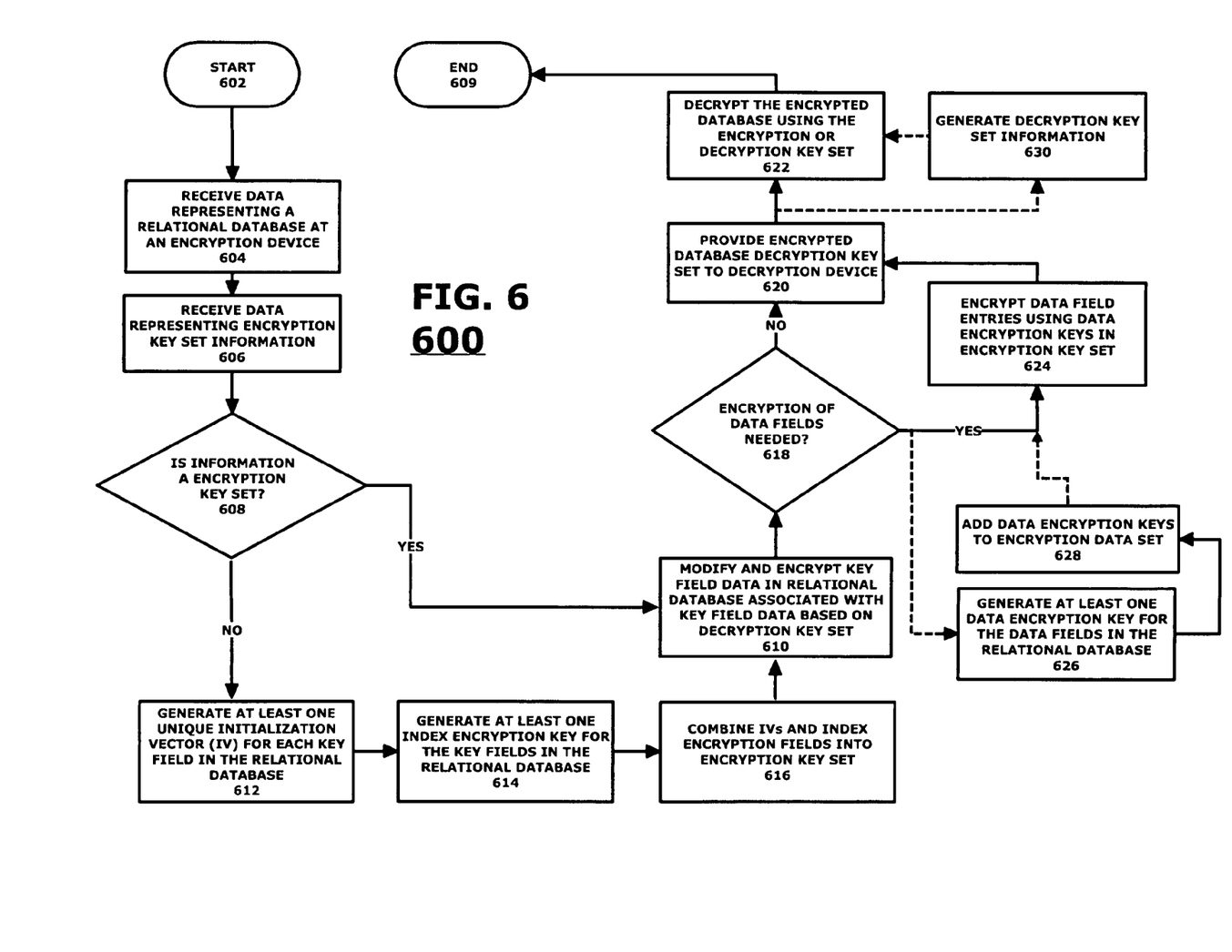
FIG. 6 is a logic flow diagram of a method of encrypting and decrypting databases according to an embodiment of the present invention.

FIG. 6 is a logic flow diagram of a method of encrypting and decrypting databases according to an embodiment of the present invention. The method can begin in step 602 and continue on to step 604. In step 604, an encryption device receives a plurality of data representing at least a portion of a relational database. For example, in the case where only the key fields are to be encrypted, the encryption device may only receive the data associated with the key fields for each table in the relational database. In the case where the entire relational database is to be encrypted, the encryption device can receive the entire contents of the relational database. Subsequently or in combination with step 604, encryption key set information can be provided to the encryption device in step 606.

As previously described the encryption key set information provided to the encryption device in step 606 can vary. For example, as previously described, the information received in step 606 can comprise an encryption key set that specifies the various IVs, index encryption keys, and/or data encryption keys to be utilized for modifying and encrypting the database tables. In other embodiments, the information received in step 606 provides only parameters for generating an encryption key set. In still other embodiments, the encryption device can be configured to receive either type of information and can be configured to interpret the information and determine how to proceed. Therefore, in step 607, the encryption device can determine whether the information received in step 606 comprises an encryption key set. If at step 608 an encryption key set is found to be included in the information received in step 606, the method can proceed to step 610 and the entries in the key fields can be modified and encrypted, as previously described with respect to FIGS. 2 and 3, using the encryption key set received in step 606.

However, if an encryption key set is not found at step 608, method 600 instead proceeds to step 612. In step 612, at least one unique IV is generated for each key field in the relational database. The IVs generated in step 612 can be generated based on the information received at step 606, as previously described with respect to FIG. 2. Subsequently or in combination with step 614, the encryption device can also generate at least one index encryption key for the key fields in the relational database. The index encryption keys can also be based on the information received at step 606. After the IVs and the index encryption keys are generated in steps 612 and 614, respectively, they can be combined into the decryption key set in step 616. Method 600 can then proceed to step 610, as previously described, to modify and encrypt the entries in the key fields.

After the key fields have been modified and encrypted in step 610, the encryption device can determine whether encryption of the data fields is also necessary in step 618. If encryption of the data fields is not necessary in step 618, the encrypted database and encryption or decryption key set information can be sent to a decryption device in step 620. Afterwards in step 622, the decryption device can decrypt the database in step 624 using the encryption or decryption key set information. Method 600 can then end at step 609. If encryption of the data fields is necessary in step 618, the entries in the data fields can be encrypted in step 624 using data encryption keys specified in the encryption key set. Afterwards, steps 620 and 622 can be completed, as previously described, and method 600 can end with step 609. In embodiments where the data encryption keys need to be generated, method 600 can first generate the data encryption keys in step 626 and add them to the decryption key set in step 628. Method 600 can then proceed with steps 624, 620, and 622 and end with step 609.

Figure 7:
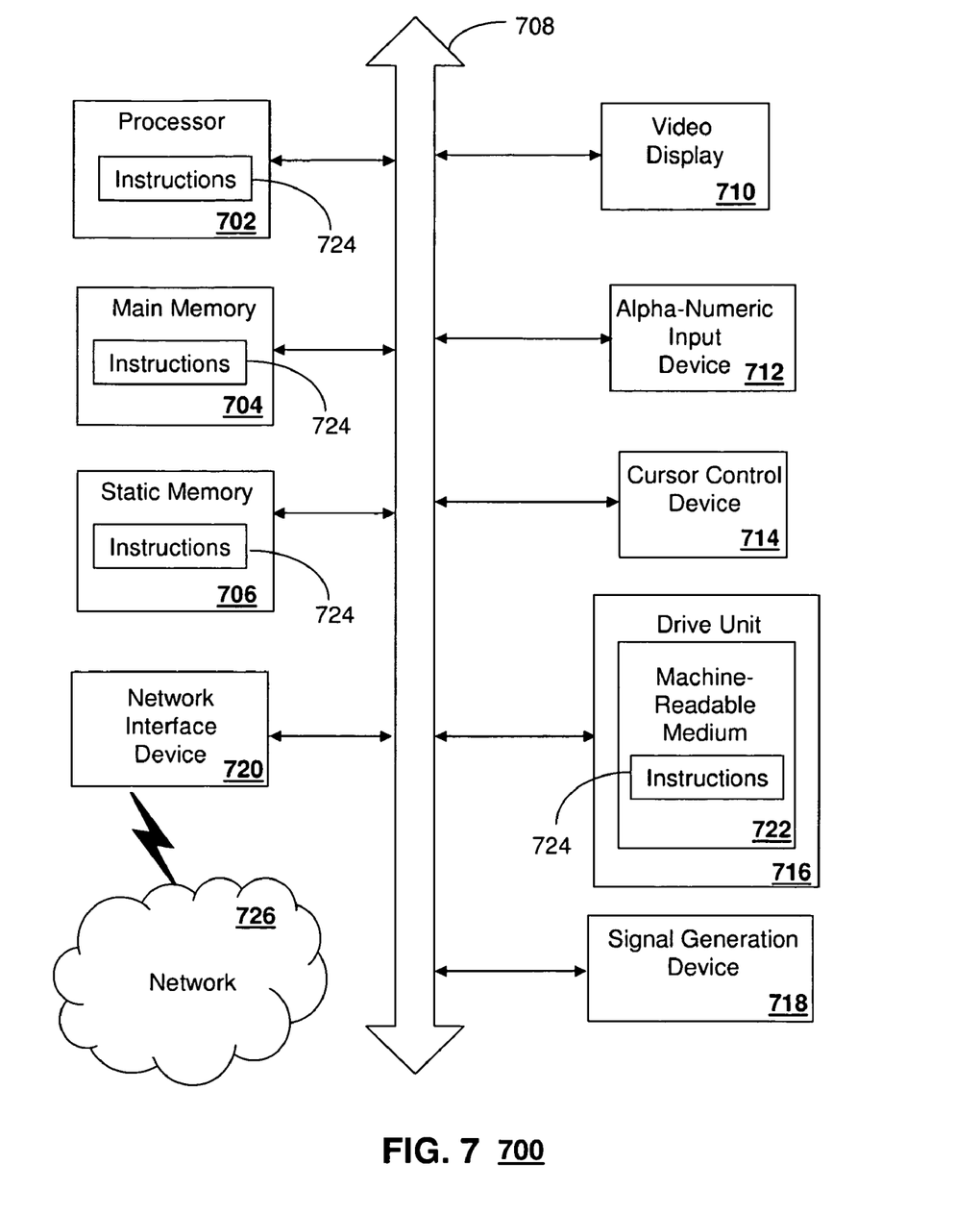
FIG. 7 is a schematic diagram of a computer system for executing a set of instructions that, when executed, can cause the computer system to perform one or more methodologies and procedures in accordance with an embodiment of the present invention.

FIG. 7 is a schematic diagram of a computer system 700 for executing a set of instructions that, when executed, can cause the computer system to perform one or more of the methodologies and procedures described above. In some embodiments, the computer system 700 operates as a standalone device. In other embodiments, the computer system 700 can be connected (e.g., using a network) to other computing devices. In a networked deployment, the computer system 700 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 700 can include a processor 702 (such as a central processing unit (CPU), a graphics processing unit (GPU, or both), a main memory 704 and a static memory 706, which communicate with each other via a bus 708. The computer system 700 can further include a display unit 710, such as a video display (e.g., a liquid crystal display or LCD), a flat panel, a solid state display, or a cathode ray tube (CRT)). The computer system 700 can include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 includes a computer-readable storage medium 722 on which is stored one or more sets of instructions 724 (e.g., software code) configured to implement one or more of the methodologies, procedures, or functions described herein. The instructions 724 can also reside, completely or at least partially, within the main memory 704, the static memory 706, and/or within the processor 702 during execution thereof by the computer system 700. The main memory 704 and the processor 702 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 724 or that receives and executes instructions 724 from a propagated signal so that a device connected to a network environment 726 can send or receive voice and/or video data, and that can communicate over the network 726 using the instructions 724. The instructions 724 can further be transmitted or received over a network 726 via the network interface device 720.

While the computer-readable storage medium 722 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

These are but a few examples. Accordingly, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The invention claimed is:

1. A computer-implemented method of securing a database, said database comprising at least a first table and a second table, said first table comprising at least a first key field and at least a first data field, said second table comprising at least a second key field and at least a second data field, said first key field specifying a first plurality of key field entries, said second key field specifying a second plurality of key field entries, and each of said first and said second plurality of key field entries including at least one common entry, the method comprising:

replacing said first plurality of key field entries in said database with a first plurality of adjusted key field entries, said first plurality of adjusted key field entries generated by applying one or more first initialization vectors to said first plurality of key field entries;

replacing said second plurality of key field entries in said database with a second plurality of adjusted key field entries, said second plurality of adjusted key field entries is generated by applying one or more second initialization vectors different from said first initialization vectors to said second plurality of key field entries; and encoding said first and said second plurality of adjusted key field entries based on one or more index keys to generate an encrypted database, wherein a value of said common entry in said first table in said encrypted database is different than a value of said common entry in said second table in said encrypted database.

2. The method of claim 1, further comprising selecting said index keys to provide at least a first encryption key and at least a second encryption key different from said first encryption key, and wherein said encoding further comprises:

encrypting said first plurality of adjusted key field entries using said first encryption key; and encrypting said second plurality of adjusted key field entries using said second encryption key.

3. The method of claim 2, wherein said encrypting said first plurality of adjusted key field entries further comprises selecting a first electronic code book (ECB) encryption key for said first encryption key and enciphering said first plurality of adjusted key field entries using ECB encryption, wherein said encrypting said second plurality of adjusted key field entries further comprises selecting a second ECB encryption key for said second encryption key and enciphering said second plurality of adjusted key field entries using ECB encryption.

4. The method of claim 2, further comprising encoding said first and second data fields using at least a third encryption key.

5. The method of claim 4, further comprising selecting said first, said second, and said third encryption keys to be different.

6. The method of claim 1, wherein said replacing said first plurality of key field entries further comprises obtaining said first initialization vectors, and wherein said replacing said second plurality of key field entries further comprises generating said second initialization vectors based on at least one of said first initialization vectors.

7. The method of claim 1, wherein said replacing said first plurality of key field entries further comprises applying at least a first one of said first initialization vectors to a first portion of said first plurality of key field entries and at least a second one of said first initialization vectors to a second portion of said first plurality of key field entries, and wherein said replacing said second plurality of key field entries further comprises applying at least a first one of said second initialization vectors to a first portion of said second plurality of key field entries and at least a second one of said second initialization vectors to a second portion of said second plurality of key field entries.

8. A system for securing data, comprising:

a storage element for storing a database, said database comprising at least a first table and a second table, said first table comprising at least a first key field and at least a first data field, said second table comprising at least a second key field and at least a second data field, said first key field specifying a first plurality of key field entries, said second key field specifying a second plurality of key field entries, and each of said first and said second plurality of key field entries including at least one common entry;

a processing element configured for securing said database, said securing comprising:

replacing said first plurality of key field entries in said database with a first plurality of adjusted key field entries, said first plurality of adjusted key field entries generated by applying one or more first initialization vectors to said first plurality of key field entries, replacing said second plurality of key field entries in said database with a second plurality of adjusted key field entries, said second plurality of adjusted key field entries is generated by applying one or more second initialization vectors different from said first initialization vectors to said second plurality of key field entries, and encoding said first and said second plurality of adjusted key field entries based on one or more index keys to generate an encrypted database, wherein a value of said common entry in said first table in said encrypted database is different than a value of said common entry in said second table in said encrypted database.

9. The system of claim 8, wherein said processing element is further configured during said securing for selecting said index keys to provide at least a first encryption key and at least a second encryption key different from said first encryption key, and wherein said processing element is further configured during said encoding for:

encrypting said first plurality of adjusted key field entries using said first encryption key; and encrypting said second plurality of adjusted key field entries using said second encryption key.

10. The system of claim 9, wherein said processing element is further configured during said encrypting of said first plurality of adjusted key field entries for selecting a first electronic code book (ECB) encryption key for said first encryption key and enciphering said first plurality of adjusted key field entries using ECB encryption, wherein said processing element is further configured during said encrypting of said second plurality of adjusted key field entries for selecting a second ECB encryption key for said second encryption key and enciphering said second plurality of adjusted key field entries using ECB encryption.

11. The system of claim 9, wherein said processing element is further configured during said securing for encoding said first and second data fields using at least a third encryption key.

12. The system of claim 11, wherein said processing element is further configured during said securing for selecting said first, said second, and said third encryption keys to be different.

13. The system of claim 8, wherein said processing element is further configured during said replacing of said first plurality of key field entries for obtaining said first initialization vectors, and wherein said processing element is further configured during said replacing of said second plurality of key field entries for generating said second initialization vectors based on at least one of said first initialization vectors.

14. The system of claim 8, wherein said processing element is further configured during said replacing of said first plurality of key field entries for applying at least a first one of said first initialization vectors to a first portion of said first plurality of key field entries and at least a second one of said first initialization vectors to a second portion of said first plurality of key field entries, and wherein said processing element is further configured during said replace of said second plurality of key field entries for applying at least a first one of said second initialization vectors to a first portion of said second plurality of key field entries and at least a second one of said second initialization vectors to a second portion of said second plurality of key field entries.

15. A system for decrypting data, comprising:

a storage element for storing an encrypted database, said encrypted database comprising at least a first table and a second table, said first table comprising at least a first encrypted key field and at least a first data field, said second table comprising at least a second encrypted key field and at least a second data field, said first encrypted key field specifying a first plurality of encrypted and adjusted key field entries, said second encrypted key field specifying a second plurality of encrypted and adjusted key field entries, and each of said first and said second plurality of encrypted and adjusted key field entries specify at least one common entry, a value of said common entry in said first table different than a value of said common entry in said second table in said encrypted database.

a processing element communicatively coupled to said storage element, said processing element configured for accessing said database, said accessing comprising:

decrypting said first and said second plurality of encrypted and adjusted key field entries based on one or more index keys to generate a first and a second plurality of adjusted key field entries, replacing said first plurality of adjusted key field entries in said database with a first plurality of decrypted key field entries, said first plurality of decrypted key field entries generated by applying one or more first initialization vectors to said first plurality of adjusted key field entries, and replacing said second plurality of adjusted key field entries in said database with a second plurality of decrypted key field entries, said second plurality of decrypted key field entries generated by applying one or more second initialization vectors different from said first initialization vectors to said second plurality of adjusted key field entries.

16. The system of claim 15, wherein said first plurality of encrypted and adjusted key field entries is encrypted using at least a first encryption key, wherein said second plurality of encrypted and adjusted key field entries is encrypted using at least a second encryption key different from said first encryption key, and wherein said processing element is further configured during said accessing for:

deciphering said first plurality of adjusted key field entries using said first encryption key; and deciphering said second plurality of adjusted key field entries using said second encryption key.

17. The system of claim 16, wherein said first and said second encryption keys comprise electronic code book (ECB) encryption keys.

18. The system of claim 16, wherein said first and said second data fields are encrypted using at least a third encryption key, and wherein said processing element is further configured during said accessing for decrypting said first and second data fields using said a third encryption key.

19. The system of claim 15, wherein said processing element is further configured during said replacing of said first plurality of adjusted key field entries for obtaining said first initialization vectors, and wherein said processing element is further configured during said replacing of said second plurality of adjusted key field entries for generating said second initialization vectors based on at least one of said first initialization vectors.

20. The system of claim 15, wherein said processing element is further configured during said replacing of said first plurality of adjusted key field entries for applying at least a first one of said first initialization vectors to a first portion of said first plurality of key field entries and at least a second one of said first initialization vectors to a second portion of said first plurality of adjusted key field entries, and wherein said processing element is further configured during said replace of said second plurality of key field entries for applying at least a first one of said second initialization vectors to a first portion of said second plurality of adjusted key field entries and at least a second one of said second initialization vectors to a second portion of said second plurality of adjusted key field entries.

* * * * *

UNITED STATES PATENT AND TRADEMARK OFFICE
CERTIFICATE OF CORRECTION

PATENT NO. : 8,165,305 B2  
APPLICATION NO. : 12/329791  
DATED : April 24, 2012  
INVENTOR(S) : Steven O. Chrysler et al.

Page 1 of 1

It is certified that error appears in the above-identified patent and that said Letters Patent is hereby corrected as shown below:

Title page, item [73] Assignee: should read: HARRIS CORPORATION, Melbourne, FL (US)

Signed and Sealed this  
Third Day of July, 2012

David J. Kappos  
*Director of the United States Patent and Trademark Office*